United States Patent
Kim et al.

(10) Patent No.: US 7,761,887 B2
(45) Date of Patent: Jul. 20, 2010

(54) RECORDING MEDIUM HAVING A REFLECTOR TO PREVENT TRAVELING OF BEAM TO RECORDING LAYER

(75) Inventors: Jin Yong Kim, Kyunggi-do (KR); Kyung Chan Park, Seoul (KR); Wae Yeul Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 760 days.

(21) Appl. No.: 10/170,543

(22) Filed: Jun. 14, 2002

(65) Prior Publication Data

US 2003/0007449 A1  Jan. 9, 2003

(30) Foreign Application Priority Data

Jun. 15, 2001  (KR)  ............. 2001-0034007

(51) Int. Cl.
   *G11B 7/24*    (2006.01)
(52) U.S. Cl. .................................. 720/718
(58) Field of Classification Search ............ 720/718, 720/719, 728
   See application file for complete search history.

(56) References Cited

U.S. PATENT DOCUMENTS

| 4,497,049 A | 1/1985 | d'Alayer de Costemore d'Arc ............ 369/47.11 |
| 4,879,710 A * | 11/1989 | Iijima ............ 720/719 |
| 5,381,392 A | 1/1995 | Hira ............ 369/53.23 |
| 5,787,069 A * | 7/1998 | Lowe et al. ............ 720/719 |
| 6,649,240 B2 * | 11/2003 | Ohishi ............ 428/64.1 |
| 6,775,838 B2 * | 8/2004 | Komaki et al. ............ 720/718 |
| 2002/0060981 A1 * | 5/2002 | Netsu et al. ............ 369/291 |

FOREIGN PATENT DOCUMENTS

| EP | 0 720 159 A2 | 7/1996 |
| EP | 0 798 707 A2 | 10/1997 |
| EP | 0 971 347 A1 | 1/2000 |
| JP | 57-150147 A | 9/1982 |
| JP | 08-273205 A | 10/1996 |
| JP | 09-091757 A | 4/1997 |
| JP | 10-124932 A | 5/1998 |
| JP | 2000-187882 A | 7/2000 |
| JP | 2000-195102 A | 7/2000 |
| JP | 2000-298878 A | 10/2000 |
| WO | WO-99/00794 A1 | 1/1999 |
| WO | WO-99/44199 A1 | 9/1999 |

* cited by examiner

*Primary Examiner*—David D Davis
(74) *Attorney, Agent, or Firm*—Birch, Stewart, Kolasch & Birch, LLP

(57) ABSTRACT

The present invention relates to a high-density disk that is structured to prevent a collision of an optical pickup's objective lens with the high-density disk if the disk is placed upside down in a disk device that is able to record and reproduce signals to/from the high-density disk. A high-density disk recording medium according to the present invention has a reflecting thin film or label, formed on a surface opposite to a recording surface, to block a beam incident to an inserted disk not to travel up to a lead-in area, which a disk device tries to read first when a disk is placed, in the event that the inserted disk has been misplaced upside down.

7 Claims, 7 Drawing Sheets

*In Case of Normal Placement*

*In Case of Misplacement*

*In Case of Misplacement*

*In Case of Normal Placement*

RECORDING MEDIUM HAVING A REFLECTOR TO PREVENT TRAVELING OF BEAM TO RECORDING LAYER

BACKGROUND OF THE INVENTION

1. Field of the Invention

The present invention relates to a high-density disk structure preventing collision of an optical pickup's objective lens with a high-density disk which is placed upside down in a disk device being able to reproduce and record signals from/to a high-density disk such as a high-density digital versatile disk (called "HD-DVD" hereinafter). The present invention further relates to a method of determining whether or not said high-density disk is placed upside down.

2. Description of the Related Art

A compact disk, usually called "CD", is 1.2 mm in thickness and 120 mm in diameter as shown in FIG. 1. A CD has a center hole of 15 mm diameter and a clamping zone of 44 mm, which encircles the center hole where the clamping zone is clamped by a damper on a spindle or a turntable installed in a disk device.

When a CD is normally placed into a disk device, its recording layer, which has pit patterns, is approximately 1.2 mm from a surface confronting an objective lens of an optical pickup equipped in the disk device. The objective lens for a CD has a numerical aperture (NA) of 0.45, which is relatively small.

A digital versatile disk, usually called "DVD", is 1.2 mm in thickness and 120 mm in diameter like a CD as shown in FIG. 2. A DVD also has a center hole of 15 mm diameter and a clamping zone of 44 mm encircling the center hole.

When a DVD is normally placed into a disk device, its recording layer, which has pit patterns, is approximately 0.6 mm from a surface confronting an objective lens of an optical pickup equipped in the disk device. The objective lens for a DVD has a NA of 0.6, which is relatively large.

A HD-DVD, which is currently being commercialized, is 1.2 mm in thickness and 120 mm in diameter, like a CD as shown in FIG. 3. A HD-DVD also has a center hole of 15 mm diameter and a clamping zone of 44 mm encircling the center hole. If a HD-DVD is normally placed into a disk device, there will be a 0.1 mm gap between its recording layer, which also has pit patterns, and a surface confronting an objective lens of an optical pickup for a HD-DVD, which has the largest NA of 0.85. The optical pickup for a HD-DVD uses a laser beam of shorter wavelength than for a CD or a DVD to record or reproduce signals in high density.

Therefore, in comparison with a CD or a DVD, HD-DVD uses an objective lens that is situated closer to the recording layer, that uses a laser beam of shorter wavelength, and that has a greater NA. According to these conditions, it is possible to concentrate a stronger intensity of light on a smaller beam spot formed on the high-density pit patterns of the recording layer of the HD-DVD. Consequently, the transmitting distance of a laser beam of shorter wavelength is shortened.

If a HD-DVD 10 is normally placed onto a turntable 11 installed in a disk device as shown in FIG. 4, a conventional servo-controlling operation for a spindle motor 12 by a motor driving unit 13 and a servo controller 15 is conducted to rotate the placed HD-DVD 10 at a constant and high speed. While the HD-DVD 10 is rotating, a focusing-servo operation is conducted to focus a laser beam for an optical pickup 14 exactly onto the recording layer 9. This operation is performed by moving the objective lens OL of the optical pickup 14 in an up and down direction within an operating distance OD. If a laser beam is exactly in focus, then reproduction (or recording) of high-density pit patterns can be accomplished.

However, when the HD-DVD 10 is misplaced onto the turntable 11 by, for example, being placed upside down as shown in FIG. 5, the HD-DVD 10 will still be rotated at a constant and high speed by the combined servo-controlling operation by the spindle motor 12, the motor driving unit 13, and the servo controller 15. However, if the HD-DVD 10 has been placed upside down, the gap between the recording layer 9 and the objective lens OL of the optical pickup 14 is 1.1 mm greater in comparison with a normally-placed HD-DVD.

In this misplacement, a laser beam cannot be focused within the conventional operating distance of the objective lens OL of the pickup 14. Therefore, the servo controller 15 supervising the focusing-servo operation continues to move the objective lens OL upward to the maximum movable distance 'OD_Max' until the laser beam is correctly focused. However, in this case, the objective lens OL will collide with the misplaced HD-DVD 10. Consequently, the HD-DVD 10, the objective lens OL, and/or the servo-mechanism would be irreparably damaged.

SUMMARY OF THE INVENTION

It is an object of the present invention to provide a high-density disk structured to have no signal detected from the high-density disk misplaced upside down through normal focusing operation in order to notify misplacement of the high-density disk to a disk device which will stop focusing operation to prevent the collision of an objective lens of an optical pickup and the high-density disk.

It is another object of the present invention to provide a method of determining the placed state of a high-density disk structured to prevent the collision of an objective lens of an optical pickup and a misplaced high-density disk.

A high-density recording medium structured according to the present invention is characterized in that it comprises: a disk having first and second surfaces, the disk including a recording area and a clamping area and defining a center hole for receiving a spindle therein; a recording layer coplanarly disposed in the disk, wherein the recording layer is in closer proximity to the second surface of the disk; and reflecting means, placed on the first surface, blocking a beam incident to the disk not to travel up to a part of the recording layer.

A method of driving a high-density recording medium structured according to the present invention is characterized in that it conducts a focusing operation at a predetermined area of an inserted disk; determines whether or not the inserted disk has been placed upside down, based on characteristic of a signal produced from a light reflected from the disk during the focusing operation; and stops the current focusing operation if determined misplaced.

BRIEF DESCRIPTION OF THE DRAWINGS

The accompanying drawings, which are included to provide a further understandings of the invention, illustrate the preferred embodiments of the invention, and together with the description, serve to explain the principles of the present invention.

DETAILED DESCRIPTION OF THE PREFFERRED EMBODIMENT

In order that the invention may be fully understood, a preferred embodiment thereof will now be described with reference to the accompanying drawings.

Figure 1:
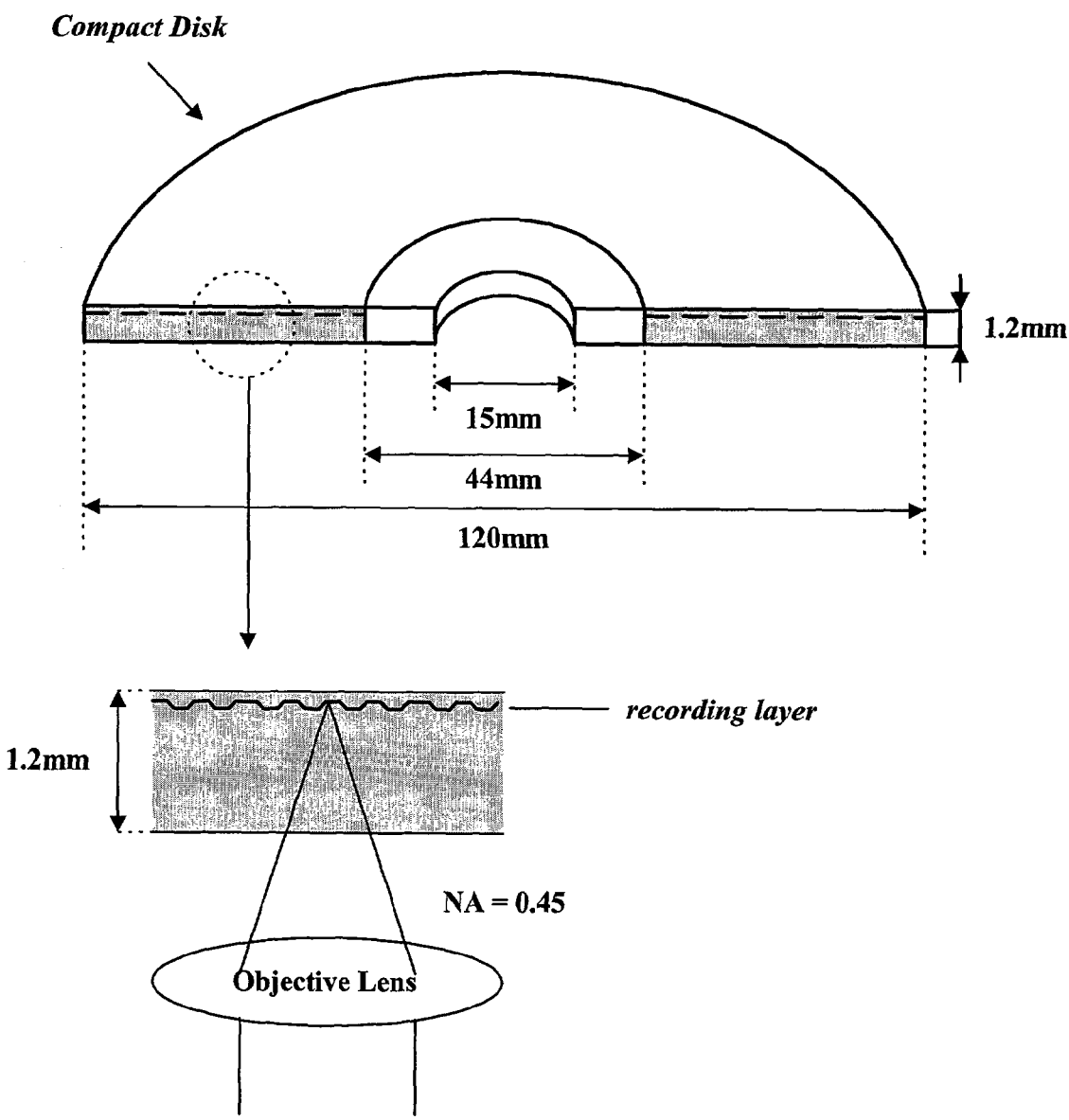
FIG. 1 shows the structure of a conventional compact disk (CD)
Figure 2:
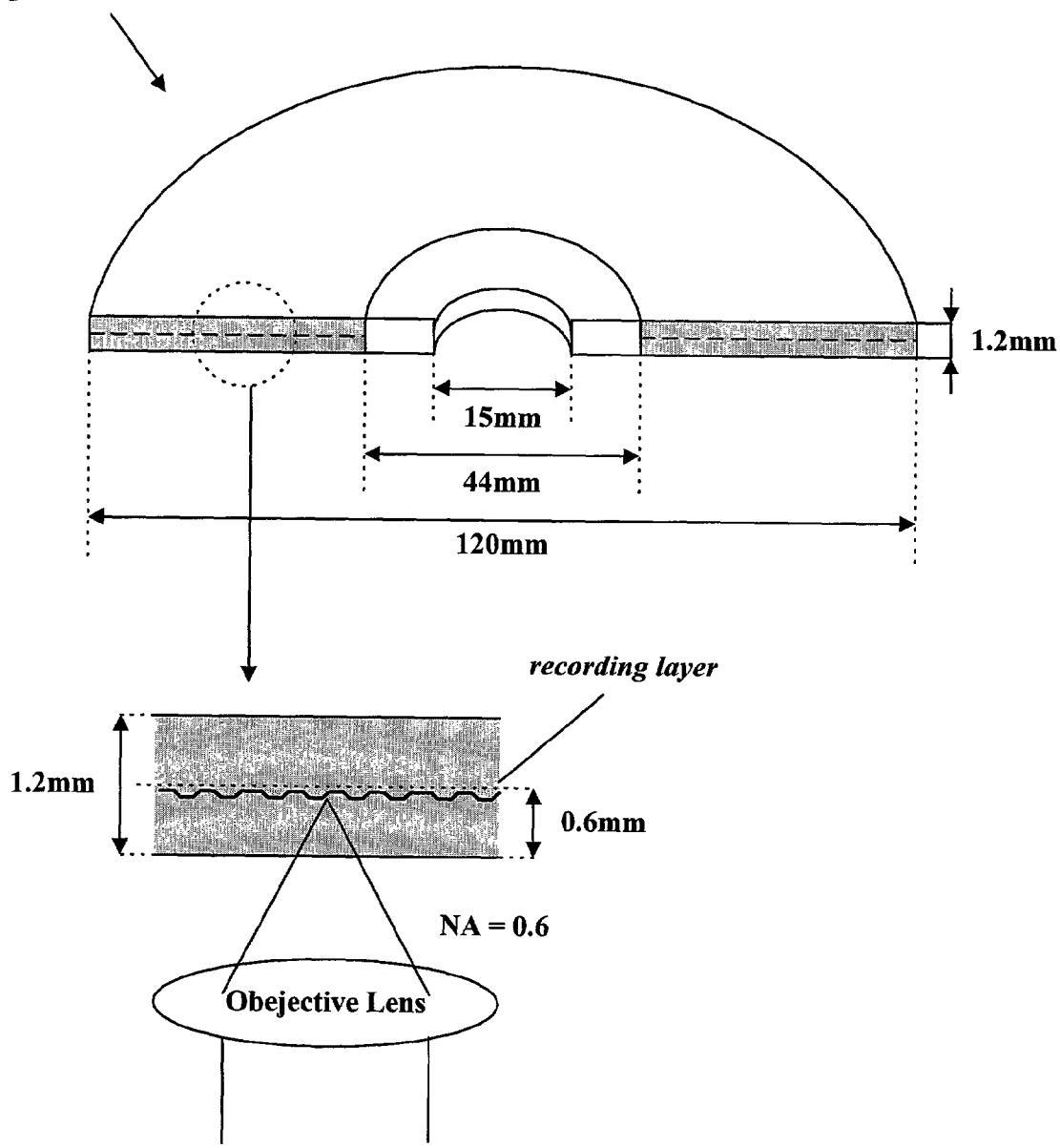
FIG. 2 shows the structure of a conventional digital versatile disk (DVD)
Figure 3:
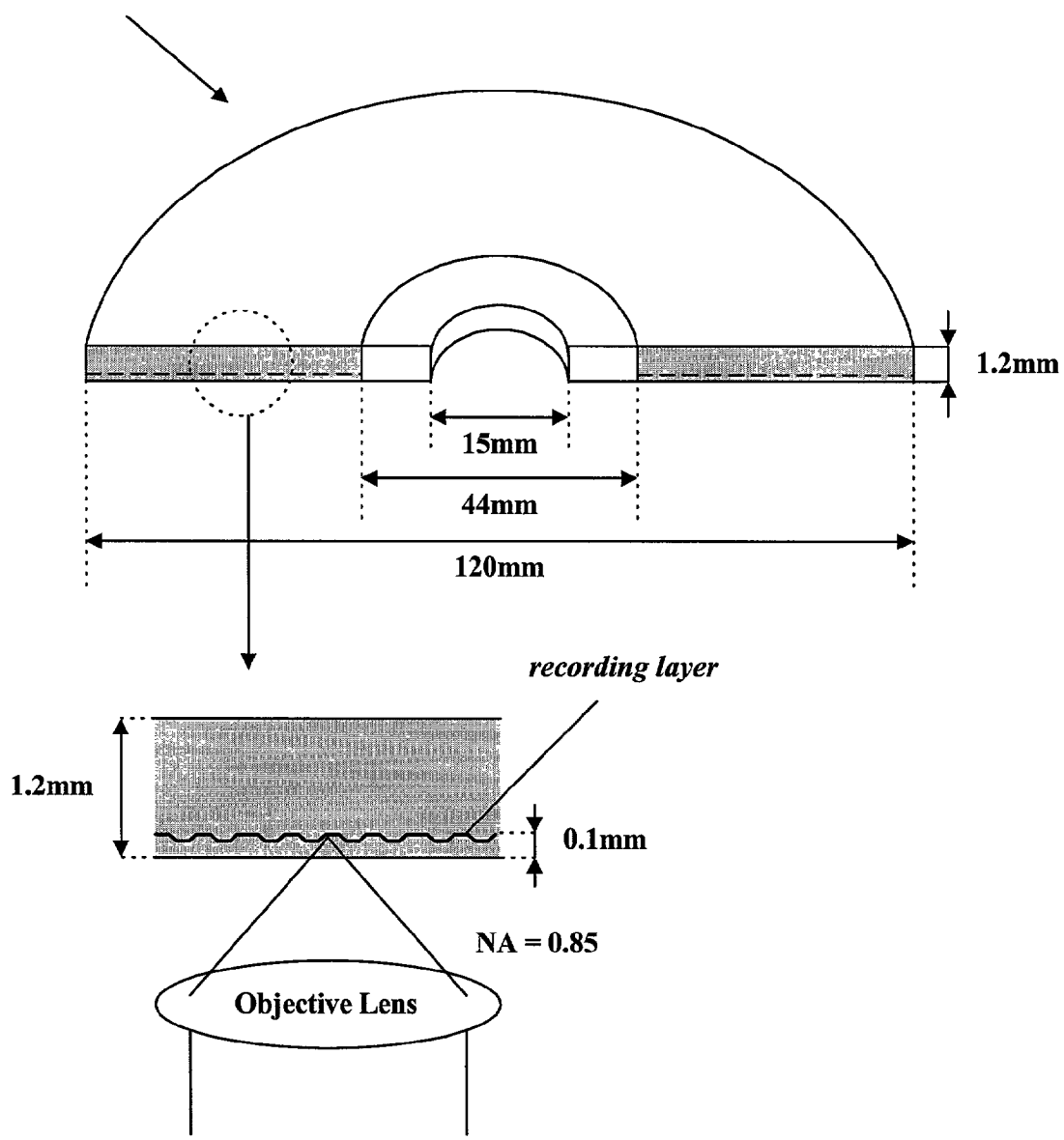
FIG. 3 shows the structure of a conventional high-density DVD (HD-DVD)
Figure 6:
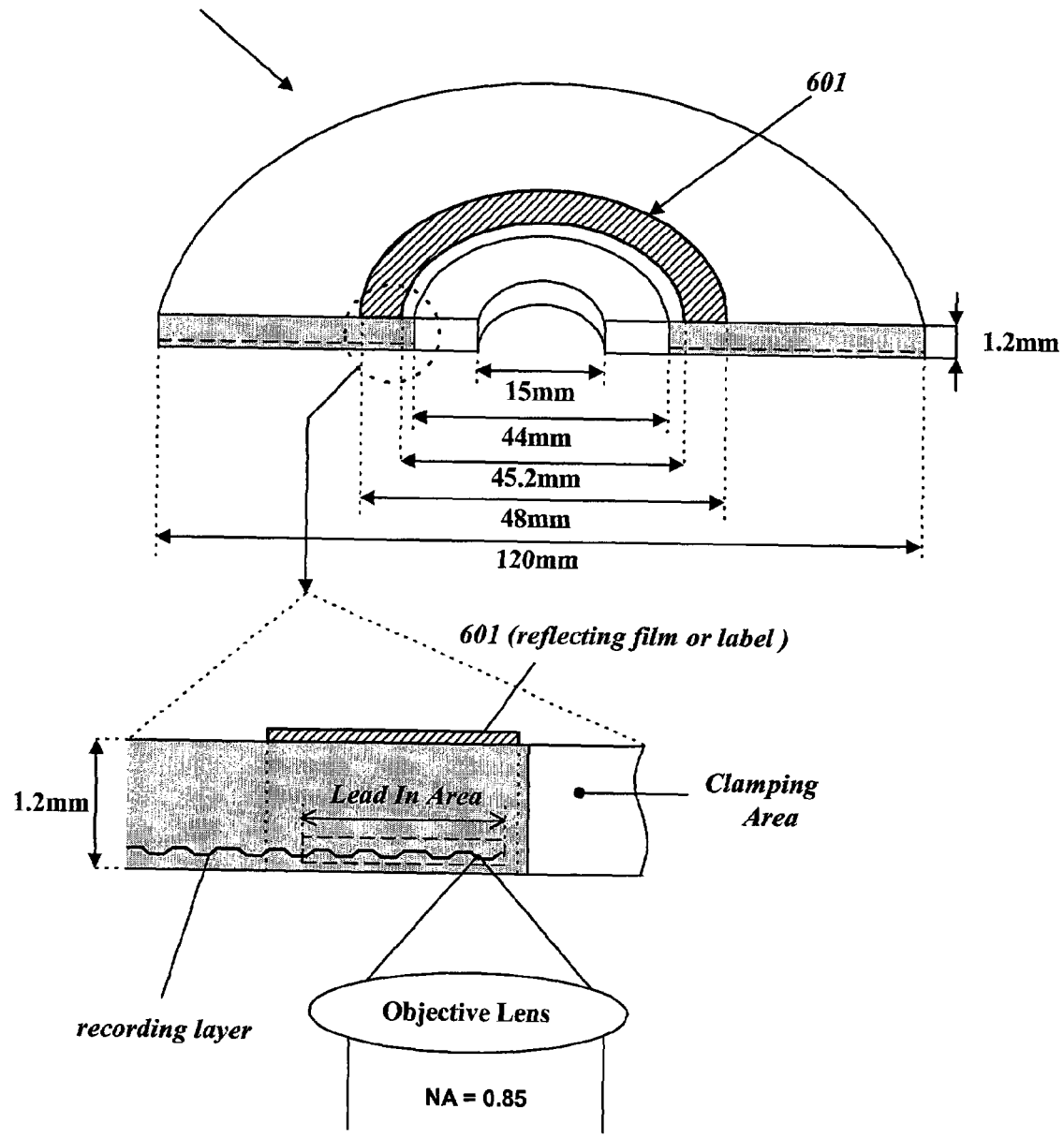
FIG. 6 is a sectional view of the first embodiment of, for example, a high-density disk structured according to the present invention.

FIG. 6 is a sectional view of the first preferred embodiment of a high-density disk structured according to the present invention. The embodiment of a high-density disk, for example, a HD-DVD according to the present invention has same dimension as a conventional HD-DVD depicted in FIG. 3, namely, 1.2 mm in thickness and 120 mm in diameter, a center hole of 15 mm diameter and a clamping zone (or clamping area) of 44 mm encircling the center hole. In addition, when the present HD-DVD 20 of FIG. 6 is normally placed into a disk device, its recording layer, which contains pit patterns, would be approximately 0.1 mm from its surface confronting the objective lens of an optical pickup as mentioned before.

Besides the above conventional structure, the present invention HD-DVD 20 in FIG. 6 has such a distinctive feature that a reflecting film 601 is formed on or a reflecting label is attached to a loop-shaped zone encircling the clamping area on a surface opposite to which a recording layer is disposed in. The loop-shaped zone is 45.2 mm in inner diameter and 48 mm in outer diameter. The width 2.8 mm is wider than a lead-in area allocated in the recording layer. The diameter range may be different from 45.2 mm~48 mm only if a lead-in area can be covered enough.

Because a lead-in area of a disk contains navigation data referred when searching recorded data, a disk device generally tries to read signals written in a lead-in area first of all when a disk is placed.

If the disk 20 structured as above is placed normally into a disk device as shown in FIG. 6, the disk surface which the loop-shaped reflecting film 601 or the loop-shaped reflecting label is formed on or attached to is at the back of the recording layer with respect to the objective lens 'OL' of an optical pickup.

Figure 4:
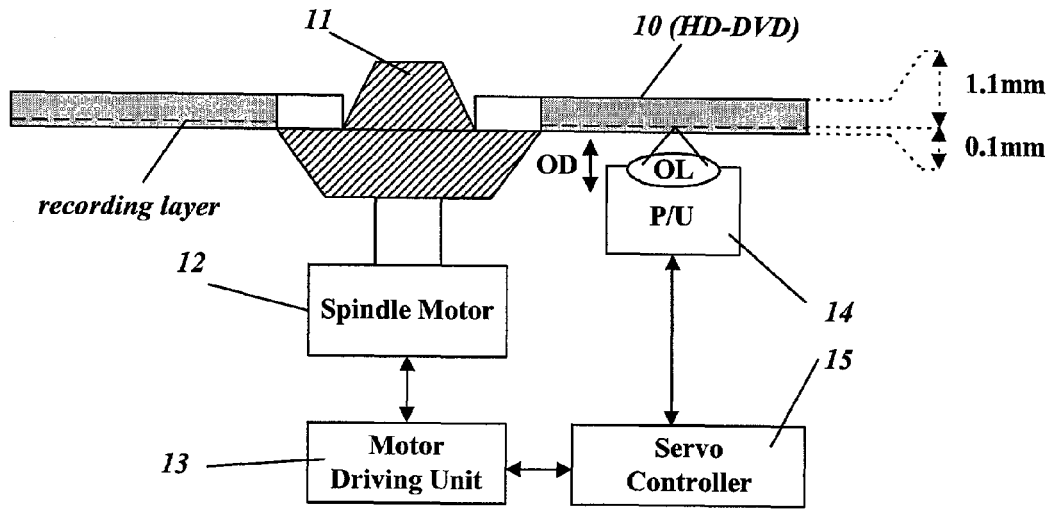
FIGS. 4 and 5 show normal placement and misplacement of a conventional high-density DVD, respectively.
Figure 5:
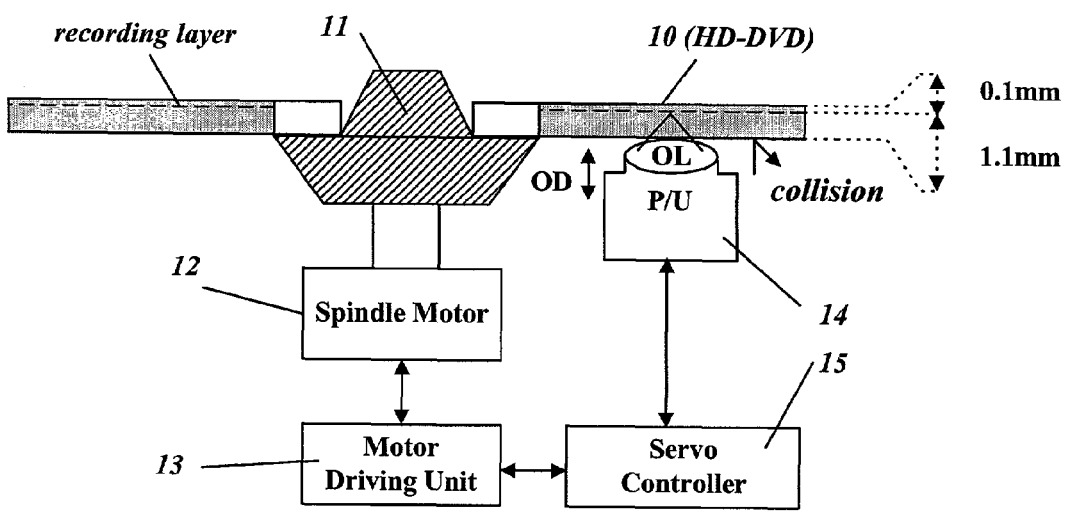

After successful clamping of the high-density disk 20, a disk device, of which operation is explained with reference to FIG. 4, conducts a conventional servo-controlling operation, characterized by the operation of the spindle motor 12, the motor driving unit 13 and the servo controller 15, to rotate the normally-placed disk 20 at a constant and high speed, and to focus a laser beam exactly onto the lead-in area of the recording layer in order to read out navigation data. After the navigation data is obtained successfully, reproduction of data written on the recording layer can be performed based on the navigation data.

Figure 7:
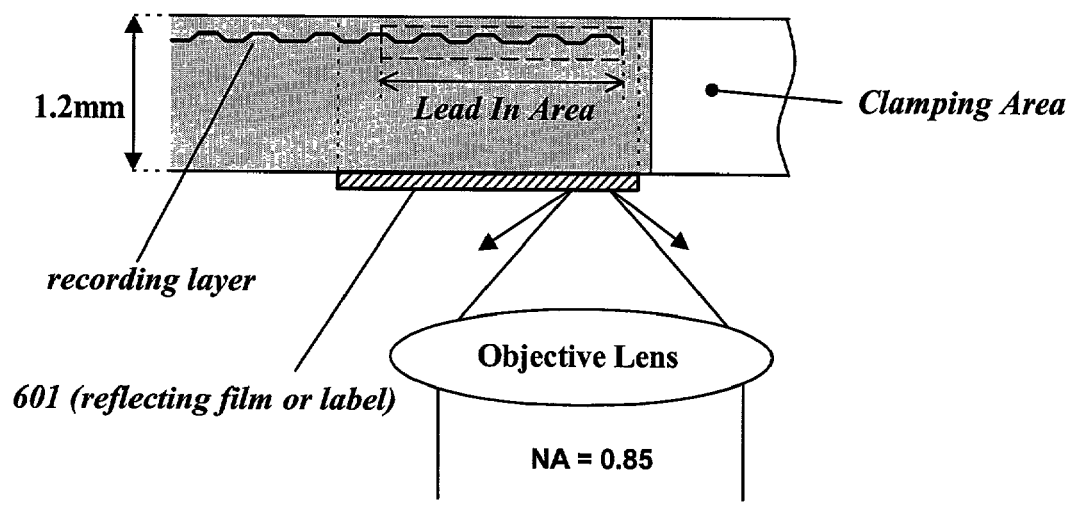
FIG. 7 shows misplacement of the first embodiment of a high-density disk structured according to the present invention.

However, if the present disk 20 is placed upside down in a disk device as shown in FIG. 7, the disk surface which the loop-shaped reflecting film 601 or the loop-shaped reflecting label is formed on or attached to is in front of the lead-in area of the recording layer with respect to the objective lens 'OL' of an optical pickup.

Even in the event that the present disk 20 is placed upside down, the disk device conducts a conventional servo-controlling operation, characterized by the operation of the spindle motor 12, the motor driving unit 13 and the servo controller 15, to rotate the misplaced disk 20 at a constant and high speed, and to try to obtain an exact focusing onto the lead-in area at the recording layer in order to read out navigation data first.

However, because the loop-shaped reflecting film 601 or the loop-shaped reflecting label below the lead-in area at the recording layer reflects an incident beam from the optical pickup, light intensity is continuously detected constant during focusing operation, which means that no valid signal is detected in a focusing error signal (FES) while moving up the objective lens 'OL'.

Therefore, a controlling means (not figured) additionally equipped in the disk device according to the present invention keeps monitoring the FES and it judges that the inserted disk 20 is placed upside down if the monitored FES maintains DC state for a predetermined time while the objective lens 'OL' moves toward the bottom surface of the placed disk 20. If judged misplaced, the controlling means immediately controls the servo controller 15 to stop current focusing operation.

Consequently, because misplacement of the present disk 20 can be judged from no signal state during focusing operation, movement of the objective lens 'OL' is stopped before a collision between the objective lens 'OL' and the misplaced disk 20.

Figure 8:
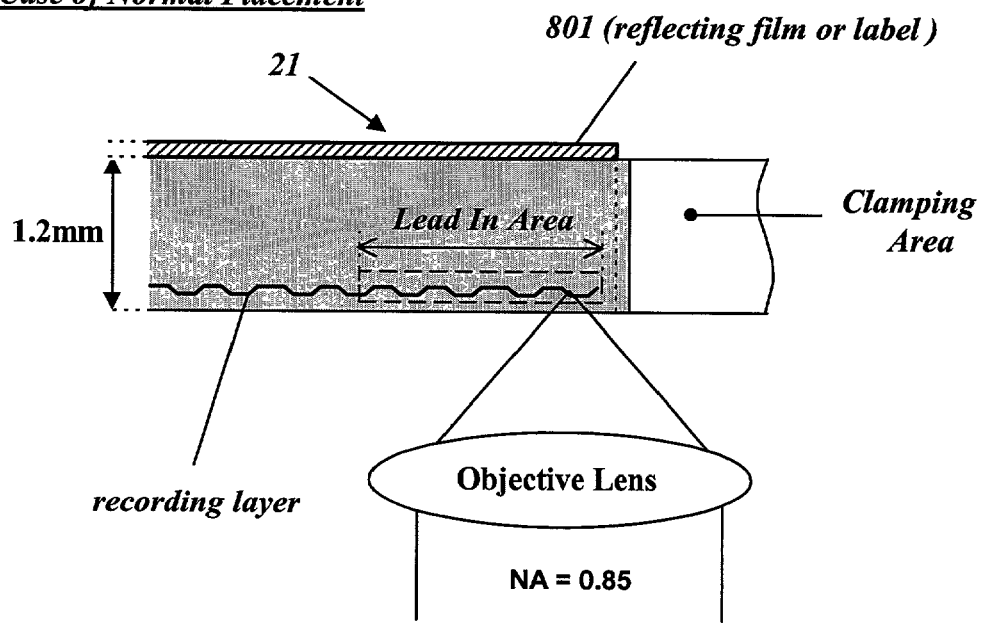
FIGS. 8 and 9 show normal placement and misplacement, respectively, of the second embodiment of a high-density disk structured according to the present invention.
Figure 9:
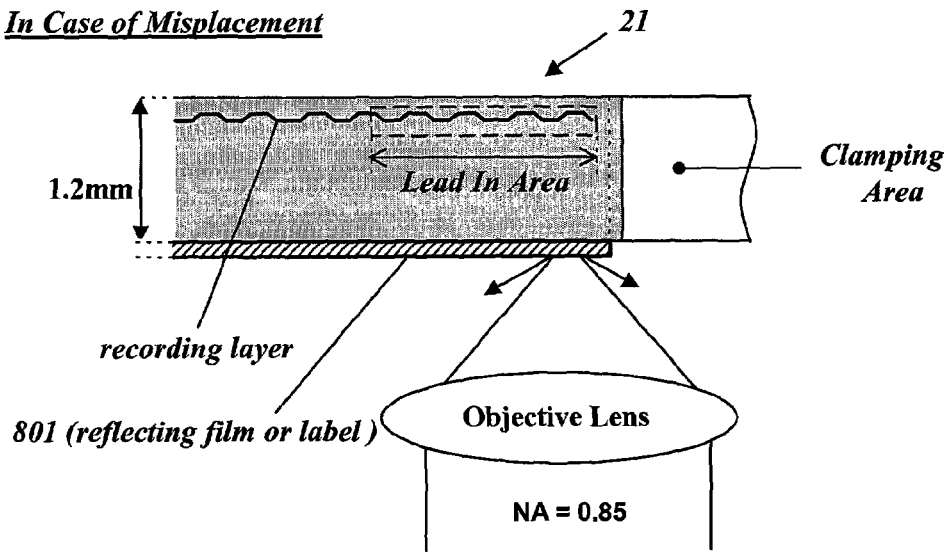

FIGS. 8 and 9 are sectional views of the second preferred embodiment of a high-density disk structured according to the present invention. FIGS. 8 and 9 show normal placement and misplacement of the present disk 21, respectively.

In the second embodiment, a reflecting film 801 or a reflecting label covers almost entire surface opposite to the recording surface the recording layer is in closer proximity to. The reflecting film 801 or the reflecting label does not cover the clamping area, preferably.

The same as the first embodiment, if the disk 21 of which one surface has been covered with the reflecting film 801 or the reflecting label as shown in FIG. 8 or 9 is misplaced upside down, its misplacement can be judged from no signal in FES in the process of normal focusing servo operation. Consequently, a collision between the objective lens 'OL' and the misplaced disk 21 can be prevented basically.

Now, it is explained how a high-density disk having a reflecting film or a reflecting label on non-recording surface is manufactured.

Figure 10:
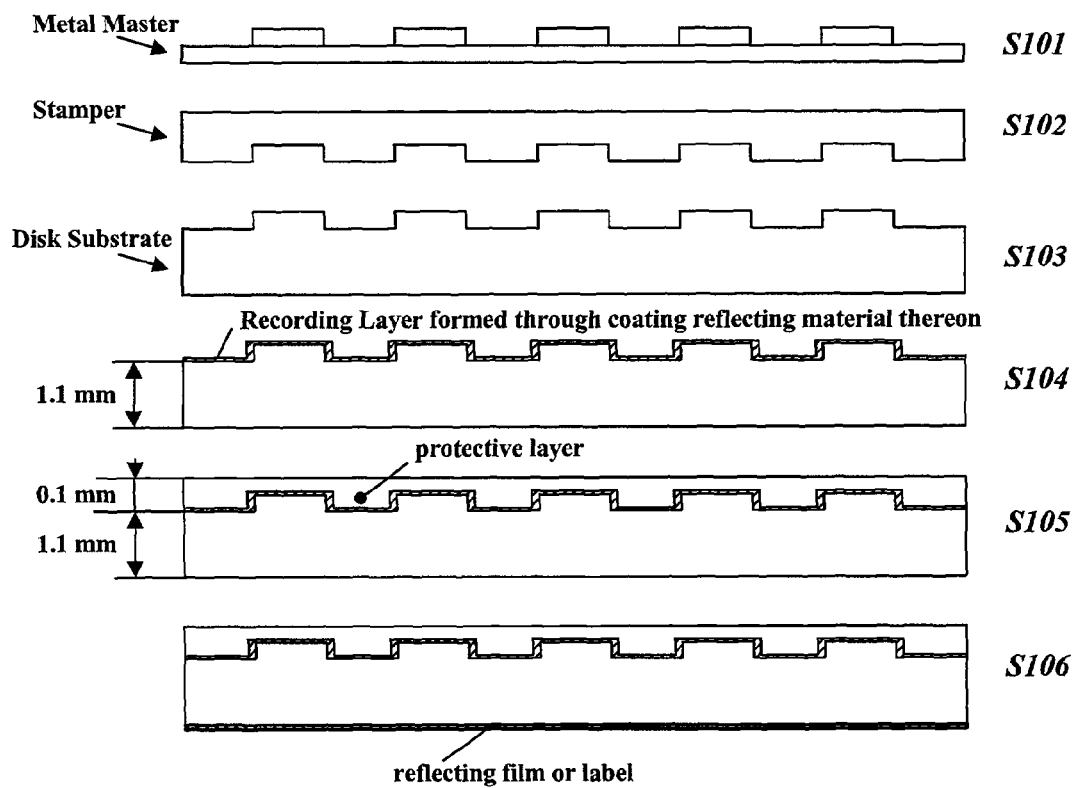
FIG. 10 shows a schematic process of manufacturing a read-only high-density disk structured in accordance with the present invention.

FIG. 10 shows a schematic process of manufacturing a read-only high-density disk having a reflecting film or a reflecting label on entire non-recording surface excluding a clamping area in accordance with the present invention. According to the disk manufacturing process of FIG. 10, a metal master is obtained through a mastering process (S101) using an electroplated glass master on which pit patterns of recorded signals are formed. Several stampers are made from the metal master (S102). The pit patterns reflecting recorded signals formed on the metal master are copied inversely onto the surface of each stamper.

A stamper is fixed firmly to an inner plate of an injection molding machine (IMM) (not figured). Afterwards, substrate material such as melt polycarbonate resin at high temperature is injected into the IMM. Then, a disk substrate having right pit patterns is produced from the fixed stamper situated in the IMM (S103). Next, pit pattern side of the disk substrate is coated with aluminum reflecting film (this layer results in a 'recording layer') (S104) by a sputtering process in which aluminum metal ions are sputtered and stuck onto the substrate.

A light transmitting layer (also called 'protective layer') is then formed on the aluminum reflecting layer by means well known to one of ordinary skill in the art, such as through a spin-coating method or a film bonding method (S105). Finally, total reflecting material such as aluminum is coated on the bottom of the disk substrate to form a thin reflecting film or a total reflecting label is bonded onto the bottom of the disk substrate, yielding the above-explained high-density disk (S106). The thin reflecting film or the reflecting label must be disposed to be overlapped vertically with a lead-in area of the disk.

The above-explained high-density disk structured in accordance with the present invention and the driving method thereof provide means by which a disk device can prevent a high-density disk, an objective lens, and/or a servo-mechanism from irreparably damaged because of a collision of an optical pickup's objective lens with the high-density disk placed upside down.

The invention may be applicable to a writable high-density disk as well as a read-only high-density disk without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A recording medium for storing data comprising:
    first and second outer surfaces, the second outer surface adapted to be placed adjacent an optical pickup for transmitting a beam from the optical pickup to store data on, or read data from, the recording medium;
    a recording area;
    a clamping area;
    a center hole for receiving a spindle therein;
    a recording layer formed in the recording area between the first and second outer surfaces, wherein the recording layer is parallel with the first and the second outer surfaces and is closer to the second outer surface than to the first outer surface; and
    reflecting means, placed on the first outer surface, to prevent a beam from the optical pickup directed toward the first outer surface of the recording medium from traveling through the first outer surface of the recording layer and to enable the beam to be reflected to the optical pickup during a time that an objective lens in the optical pickup moves relative to the recording medium when the first outside surface of the recording medium is placed adjacent to the optical pickup, and
    wherein the width of the reflecting means is larger than the width of an area allocated for navigation data used in searching for data written in the recording layer along the radial direction of the recording medium.

2. The medium of claim 1, wherein said reflecting means is a thin reflecting film formed on the first outer surface.

3. The medium of claim 1, wherein said reflecting means is a reflecting label attached to the first outer surface.

4. The medium of claim 1, wherein said area allocated for navigation data is a lead-in area of the recording medium.

5. The medium of claim 1, wherein said reflecting means covers the first outer surface excluding the clamping area.

6. The recording medium of claim 1, wherein the reflecting means is formed in a loop-shaped zone encircling the clamping area on the first outer surface to prevent the beam incident to the recording medium from traveling up to the recording layer.

7. The recording medium of claim 1, wherein the recording layer is located at about 0.1 mm from the second outer surface.

* * * * *